Aug. 21, 1928.
M. F. RICHARDSON
VALVE
Filed Dec. 14, 1922
1,681,364
FIG. I.
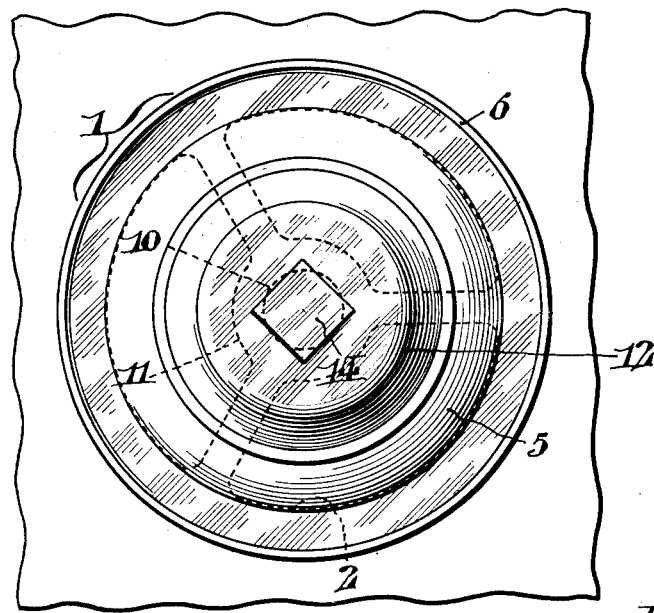
FIG. III.
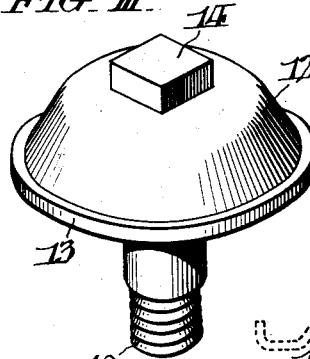
FIG. II.
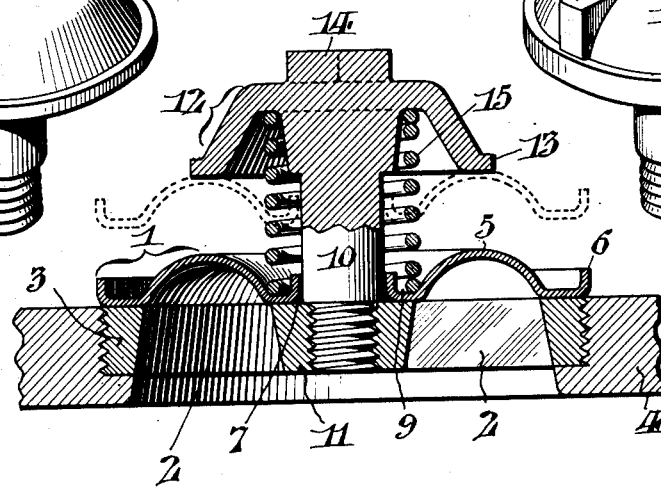
FIG. IV.
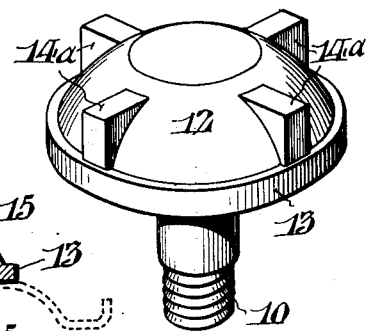
WITNESSES:
John E. Bergner
Alfred E. Ischinger
INVENTOR:
Maurice F. Richardson
BY Fraley & Paul
ATTORNEYS.

Patented Aug. 21, 1928.

1,681,364

UNITED STATES PATENT OFFICE.

MAURICE F. RICHARDSON, OF BERWYN, PENNSYLVANIA.

VALVE.

Application filed December 14, 1922. Serial No. 606,783.

My invention relates generally to valves, and more particularly to pump valves of the type capable of operating responsively to the suction and pressure pulses of a pump in opening and closing the valve ports.

Amongst the objects of my invention are to absorb shocks incidental to the operation of such valves with a view to easing their operation and increasing their longevity; to prevent binding of the movable valve member with the means provided for its guidance; and to reduce head resistance for facilitation of fluid flow about them in passing to the valve ports. The first of these objects is fulfilled, in accordance with my invention, by providing for trapping the fluid displaced locally, incidental to the movement of the closure member of the valve, for cushioning purposes; the second, by provision of a guard tending to prevent undue angular tilting of the closure member of the valve while sliding upon its guide, also to insure full valve opening; and the third, by provision of a flared overhang, preferably by proper shaping of the guard just referred to, affording an inclined surface as a continuation of a correspondingly inclined surface of said closure member to deflect the fluid uniformly toward the valve port.

Other objects and attendant advantages of my invention will be readily understood from the detailed description which follows and its scope as readily comprehended from the appended claims.

Referring to the drawings Fig. I is a plan view of a pump valve assemblage conveniently embodying my invention.

Fig. II is a vertical axial sectional view of the same.

Fig. III is a perspective view of the guide stem for the movable valve member together with the associated guard apron; and Fig. IV shows a slightly modified form of the same.

As herein shown, a valve structure typical of my invention includes a movable member comprehensively indicated by the numeral 1, which serves as a closure for the ports 2 in a replaceable seat member 3, the latter being screwed or otherwise fastened in the wall or partition 4 whereby the valve chest of the pump is set apart from the pump cylinder. The movable valve member 1 is, in the present instance, circular in form and preferably made of comparatively thin sheet metal die stamped or spun to the configuration best seen in Fig. II. From this illustration, it is to be observed that an annular arched embossment or ridge 5 slopes downwardly toward, and merges into the periphery of the disc 1 which is abruptly turned to provide a vertical flange 6. The disc 1 furthermore has a central flanged aperture 7 and a concentric depression 9 surrounding said aperture and flanking the inner side of the arched portion 5. Such embossing and flanging affords concentric recesses and, obviously, enhances rigidity of the disc 1 to strengthen the same against distortion and are otherwise useful as will be noted presently. Movement of the disc 1 is guided by a stem 10 which fits the axial aperture 7 with ample allowance for free play, and is screwed into a central boss 11 of the seat member 3. This stem 10 is surmounted by an overhang in the form of a bell shaped guard apron 12 which is open toward the valve seat 3 and whose wall is flared downwardly and outwardly to terminate with a peripheral flange 13. The apron 12 is preferably made integral with the stem 10 for simplicity of manufacture, ease of assembly and minimization of parts. A polygonal axial projection 14 of the stem 10 permits the use of a wrench in mounting and removing the same from the valve seat 3.

Interposed between the apron 12 and the valve disc 1 is a helical actuating spring 15 which is held against displacement, axially, by virtue of having its ends engaged, respectively, in the annular recessed portion 9 of the valve disc 1, and the interior of the apron 12. Particular attention is drawn to the location of the guard flange 13 directly above the arched-ridge high-point 5, while the latter coincides with an imaginary center line through the ports 2; also, that the spring 15 is of a diameter which ensures its pressure forces being exerted within the confines of the inner annular valve seat and never "over" the ports 2.

The mode of operation of my improved valve may be briefly described as follows:

As suction is induced by movement of the pump piston, the valve disc 1 in responding, is raised to the elevated position shown in dotted lines in Fig. II in opposition to the compressive force of the spring 15 thus opening the ports 2 for passage of fluid therethrough. In the course of the action just referred to, the stem 10 serves to guide the valve disc 1 perpendicularly to the valve seat 3, while the fluid displaced locally by movement of said disc, is trapped within the chamber afforded within the interior of the apron 12 and the inner central recess of said valve disc to cushion approach of the latter toward the peripheral flange 13 by which upward movement is limited. By institution of this provision, it will at once be apparent to those familiar with this art, that the noise attendant valve operation is greatly reduced, and, moreover, easement of valve operation through shock absorption as above noted, will enhance longevity of the valve structure especially in cases of high speed action.

If in raising, the valve disc 1 should tend to "cant", the high side in encountering the stop flange 13 will be arrested, as a consequence of which undue tilting likely to cause binding on the guide stem 10 is prevented, thus permitting the opposite side of the disc 1 to follow without hindrance until the position of full valve opening is reached with said disc perfectly poised above, parallel to the valve seat 3 and against its limiting stop. The maintenance of this true parallel open position of the valve disc 1 is assured since the region of contact of the stop flange 13 is well toward the disc periphery,—to be exact, directly against the high portion of the annular arched embossment 5 as shown, so that any subsequent canting of the disc 1 cannot possibly take place. It is to be further observed that when the disc 1 is in its elevated position, the central recess 9 of the latter forms jointly with the hollow of the guard apron 12, a cavity for accommodating the actuating spring 15 with avoidance of solid compression, thereby allowing full valve opening with the disc 1 in contact with the limiting stop flange 13 as already explained.

Referring now to the modification of Fig. IV, it will be noted that the valve stem 10 and associated guard apron 12 there shown is generally similar to the one illustrated in Fig. III, the only difference residing in the provision of a series of lugs 14ª in lieu of the integral projection 14 of the first form. This type of valve stem 10 is useful in cases where the space available is limited, the projections 14ª lying wholly beneath the top of the guard apron 12 so that there are no projections beyond this point. The projections 14ª permit the use of a spanner wrench instead of a wrench of the ordinary type and therefore serve in the same capacity as the projection 14. In all other respects the structure of Fig. IV is identical, both as to form and function, as that shown in Fig. III.

The several characteristic features which I have herein attributed to my invention when taken collectively, tend to greatly ease valve action with consequent attainment of increased efficiency in operation, namely, through shock absorption, assurance of positive action by prevention of binding, and minimization of head resistance.

Having thus described my invention, I claim:

1. In a valve of the type described the combination, with a ported seat member, of a movable disk having an annular arched-ridge intermediate concentric seating surfaces forming concentric recesses and shaped to induce stream-line flow through the valve, the high-point of said arched-ridge coinciding with a center line through the port openings; and a stationary guide stem with a downwardly-flared overhang affording an abutment for engagement by the arched-ridge of the aforesaid disk in limiting movement of the latter, and in conjunction with the inner recess of the movable disk forming a cavity to accommodate the spring with avoidance of solid compression.

2. In a valve of the type described the combination, with a ported seat member, of a sheet metal disk having an annular arched-ridge intermediate concentric seating surfaces with perimetric upset flanges, said arched portion bridging the port openings and inducing stream-line flow through the valve, and a stationary stem having a flared-overhang affording an annular abutment for the high-point of the arched-ridge of said disk in limiting movement of the latter, and in conjunction with the central recess providing a cavity to accommodate the spring with avoidance of solid compression.

3. In a valve of the type described the combination, with a ported seat member, of a movable centrally apertured disk having an annular arched-ridge intermediate concentric seating surfaces with upset peripheral flanges, said disk being adapted to induce stream-line flow through the valve, and a stationary guide stem having an overhang with a lateral lip flange coinciding with the arched-ridge high-point and affording an annular abutment for limiting movement as well as to prevent canting of the disk aforesaid, said overhang in conjunction with the central recess providing a cavity to accommodate the spring with avoidance of solid compression.

4. In a valve of the type described the combination, with a ported seat member, of a movable centrally apertured disk having an annular arched-ridge intermediate concentric seating surfaces with abruptly turned peripheral flanges, said disk being adapted to induce stream-line flow through the valve, and a guide stem with an overhang flared toward the disk, the apex of the arched-ridge and the lip of the overhang coinciding with a central line through the valve ports, and said overhand functioning—in conjunction with the inner recess of the aforesaid disk—as a fluid trap to cushion the action of the valve, as well as providing a cavity to accommodate the spring with avoidance of solid compression.

5. In a valve of the type described the combination, with a ported seat member, of a movable centrally apertured sheet metal disk having an annular arched-ridge intermediate concentric seating surfaces with abruptly turned peripheral flanges, said disk being adapted to induce stream-line flow through the valve, a guide stem with a downwardly flaring overhang serving as a trap to limit movement of the disk while affording jointly with the central depression of said disk a cavity for accommodating and preventing solid compression of the valve spring, the high-point of the arched-ridge and median of the overhang lower edge coinciding with a center line through the valve ports, and manipulating means on the outer face of the overhang.

6. In a valve of the type described, the combination of a valve member embodying an annular arched-ridge intermediate concentric seating surfaces and a convex guard member having a lateral lip, the high point of said arched-ridge and the median of the lateral lip co-inciding with a center line through the valve port openings, said valve and guard members jointly providing a substantially enclosed fluid-trapping cavity wholly within an area bounded by the center line aforesaid, for the purpose specified.

In testimony whereof, I have hereunto signed my name at Philadelphia, Pennsylvania, this 8th day of December 1922.

MAURICE F. RICHARDSON.